(12) United States Patent
Adal

(10) Patent No.: US 9,188,794 B2
(45) Date of Patent: Nov. 17, 2015

(54) EYEGLASSES SUPPORT

(71) Applicant: Tiblez Adal, Arlington, VA (US)

(72) Inventor: Tiblez Adal, Arlington, VA (US)

(*) Notice: Subject to any disclaimer, the term of this patent is extended or adjusted under 35 U.S.C. 154(b) by 115 days.

(21) Appl. No.: 14/052,752

(22) Filed: Oct. 13, 2013

(65) Prior Publication Data

US 2015/0103305 A1  Apr. 16, 2015

(51) Int. Cl.
  *G02C 5/14* (2006.01)
  *G02C 5/16* (2006.01)

(52) U.S. Cl.
  CPC . *G02C 5/143* (2013.01); *G02C 5/16* (2013.01)

(58) Field of Classification Search
  CPC ........ G02C 5/143; G02C 3/003; G02C 5/146; G02C 5/14; G02C 5/16
  USPC ........... 351/155, 123, 111, 121, 158, 119, 41, 351/114
  See application file for complete search history.

(56) References Cited

U.S. PATENT DOCUMENTS

| | | | |
|---|---|---|---|
| 104,216 A | 6/1870 | Sickels | |
| 2,557,414 A * | 6/1951 | Coull | 351/111 |
| 3,503,676 A | 3/1970 | O'Neill | |
| 3,832,043 A | 8/1974 | Usdan | |
| 3,840,294 A * | 10/1974 | Kneier | 351/59 |
| 3,943,925 A | 3/1976 | Leight | |
| 3,955,885 A | 5/1976 | Aronsohn | |
| 4,202,609 A * | 5/1980 | Reese | 351/111 |
| 4,723,844 A * | 2/1988 | Medina | 351/111 |
| 5,162,823 A * | 11/1992 | Goldstein | 351/123 |
| 5,302,977 A * | 4/1994 | Markovitz et al. | 351/114 |
| 5,859,684 A * | 1/1999 | Rittmann | 351/111 |
| 7,641,334 B1 * | 1/2010 | Goldie | 351/123 |
| 8,454,156 B2 | 6/2013 | Frank | |
| 8,820,921 B1 * | 9/2014 | Lier et al. | 351/123 |
| 2006/0077339 A1 * | 4/2006 | Jamie et al. | 351/119 |

* cited by examiner

*Primary Examiner* — Hung Dang
(74) *Attorney, Agent, or Firm* — Kenneth R. Rice

(57) ABSTRACT

The Auxiliary Eyeglasses Support is a support arm that is firmly attached to a person's ear, and extends forward to support the front portion of the eyeglasses. This will prevent the eyeglasses from slipping down on a person's nose. The Auxiliary Eyeglasses Support maybe used singly on only one side of the head, or as a pair on both sides of the head.

12 Claims, 4 Drawing Sheets

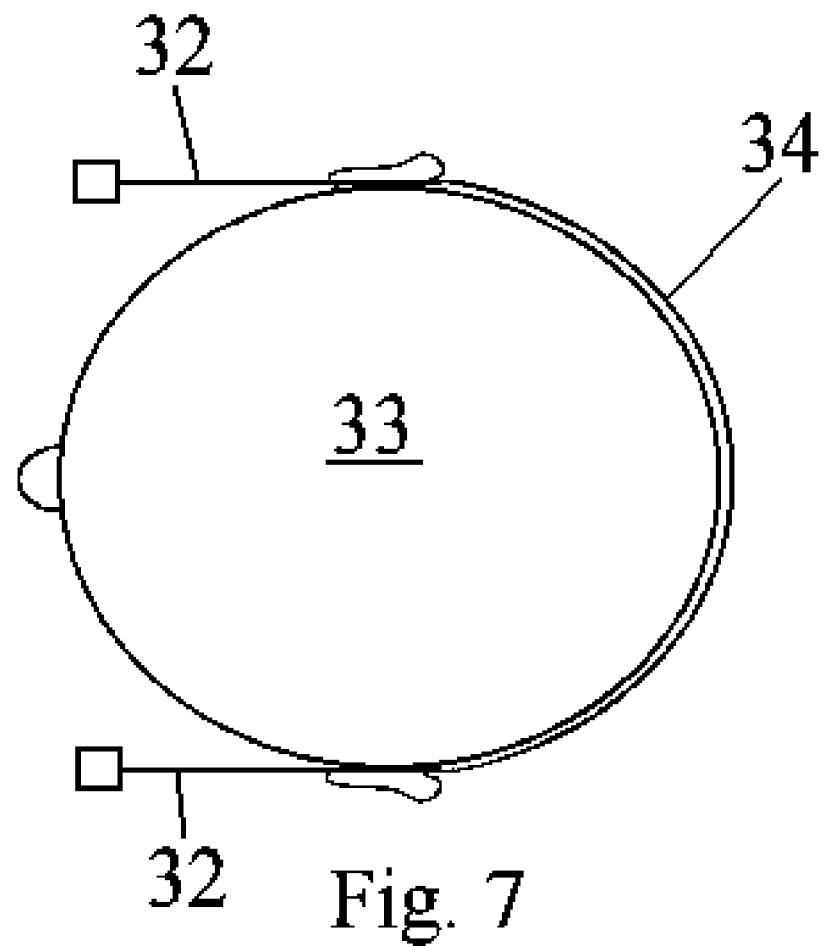
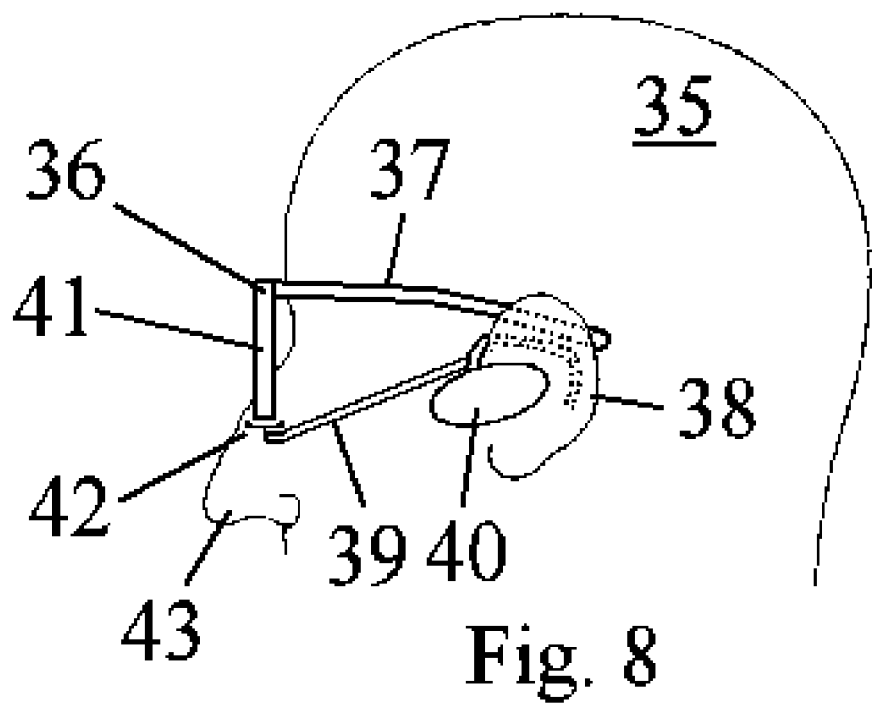

EYEGLASSES SUPPORT

BACKGROUND OF THE INVENTION

This invention relates, in general, to an auxiliary support to prevent eyeglasses from slipping down the nose of the person wearing them. A common problem a wearer of eyeglasses has is the eyeglasses tend to slip down the nose in many situations. If the nose is sweaty, the glasses will slip down the nose. If the person is bending over while working on a task, the eyeglasses may slip down the nose. Many solutions have been proposed to remedy this problem, but they all have drawbacks to their use. Some require an arm to be attached to the eyeglasses, other require the eyeglasses be modified in some way.

DESCRIPTION OF THE PRIOR ART

In the prior art various types of devices have been proposed. For example, U.S. Pat. No. 104,216 issued Jun. 14, 1870, to Sickels for an Eye-Glass Holder. This reference shows a strap that wraps around the forehead, and is provided with a hook that drops down to connect to the bridge of a pair of eyeglasses to support them in front of the eyes.

U.S. Pat. No. 3,503,676 issued Mar. 31, 1970, to O'Neill for Eyeglasses With Temporal Bone Bearing Auxiliary Bows. This reference shows eyeglasses with an extra pair of arms connected at the front of the earpieces, The extra arms extend slightly downward to rest on the cheeks to assist in supporting the eyeglasses so that they do not rest upon the nose.

U.S. Pat. No. 3,823,043 issued Aug. 27, 1974, to Usdan for a Spectacles Positioning Apparatus. This reference shows eyeglasses with an extra pair of arms connected at the front of the earpieces, The extra arms extend downward to rest on the cheeks to assist in supporting the eyeglasses so that they do not rest upon the nose.

U.S. Pat. No. 3,943,925 issued Mar. 16, 1976, to Leight for an Ear Protector Assembly. This reference shows an ear protector mounted on an arm connected to the earpieces of a pair of eyeglasses.

U.S. Pat. No. 3,955,885 issued May 11, 1976, to Aronsohn for an Eyeglass Support Device. This reference shows a pair of supports which clip to the bottom edge of the eyeglasses. Their purpose is to support the eyeglasses to prevent them from resting on the nose.

U.S. Pat. No. 8,454,156 issued Jun. 4, 2013, to Frank for a Eyeglass Support. This reference shows a strap that wraps around the head, and is provided with a hook that drops down to connect to the bridge of a pair of eyeglasses to support them in front of the eyes.

U.S. Patent Application No. 2006/0077339 published on Apr. 13, 2006, filed by Jamie et al. for Eyeglass Frames With Lateral Support. This reference shows addition arms attached to the earpieces to assist in supported the eyeglasses off of the nose.

SUMMARY OF THE INVENTION

The present invention is directed to an auxiliary support arm that is attached to a person's ear, and extends forward to support the front portion of the eyeglasses.

It is an object of the present invention to provide a new and improved eyeglasses accessory to prevent the eyeglasses from slipping down the nose.

These and other objects and advantages of the present invention will be fully apparent from the following description, when taken in connection with the annexed drawings.

BRIEF DESCRIPTION OF THE DRAWINGS

FIG. 7 is a top view of a fifth embodiment using two of the eyeglasses supports.

FIG. 8 is a side view of a sixth embodiment used with an ear mounted appliance.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
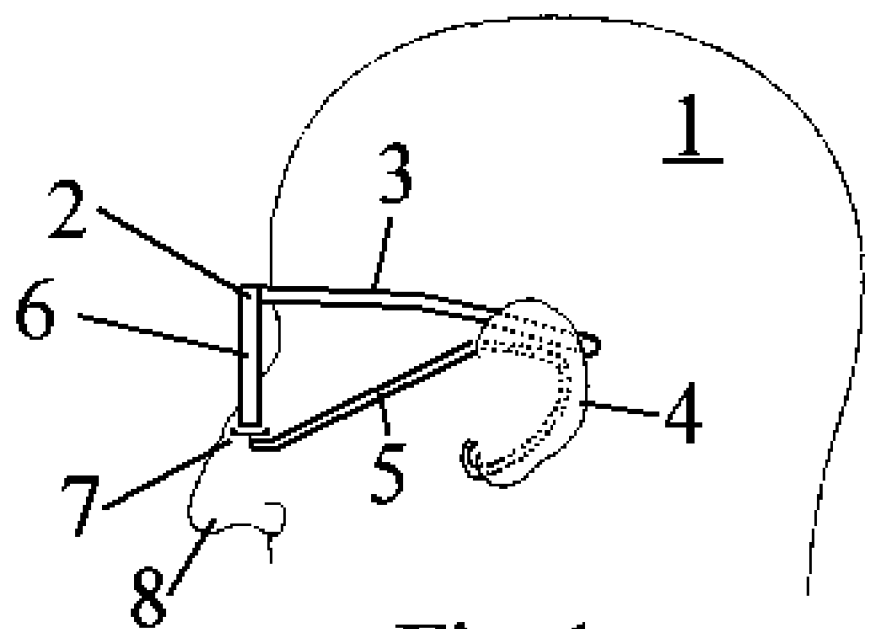
FIG. 1 is a side view of the eyeglasses support.

Referring now to the drawings in greater detail, FIG. 1 shows a person 1 wearing a pair of eyeglasses 2. The earpieces 3 of the eyeglasses 2 fit behind the ear 4 of the person 1. The eyeglasses support 5 fits tightly around the ear 4, passing over the top of the ear 4 and wrapping behind the ear 4 and around the bottom of the ear 4 to firmly hold the eyeglasses support 5 in position. The eyeglasses support 5 extends forward to a point under the lenses 6 of the eyeglasses 2. The eyeglasses support 5 terminates in a small rest 7 which bears upward on the lenses 6. The small rest 7 may be flat or it may be contoured to fit around the bottom edge of the lenses 6. This will provide additional support for the eyeglasses 2 and prevent them from slipping down the nose 8.

The eyeglasses support 5 is made of a pliable material. This allows the position of the small rest 7 relative to the lenses 6 and the ear 4 to be adjusted by changing the position at which the eyeglasses support 5 is bent to fit around the ear 4, resulting a customized fit of the eyeglasses support 5.

Figure 2:
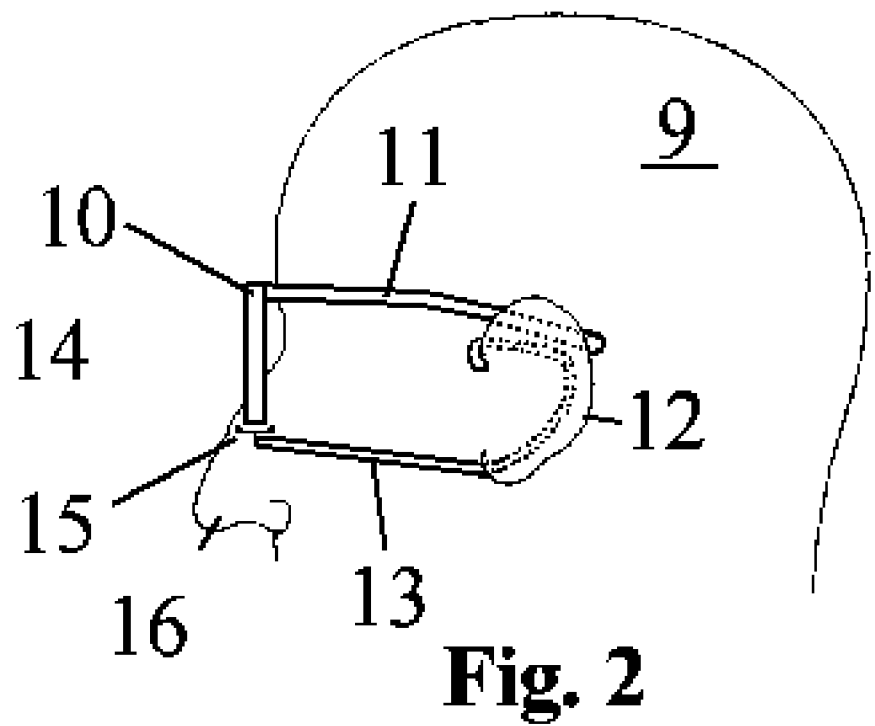
FIG. 2 is a side view of the eyeglasses support showing a second embodiment.

In a second embodiment, FIG. 2 shows a person 9 wearing a pair of eyeglasses 10. The earpieces 11 of the eyeglasses 10 fit behind the ear 12 of the person 9. The eyeglasses support 13 fits tightly around the ear 12, passing under the bottom of the ear 12 and wrapping behind the ear 12 and over the top of the ear 4 to firmly hold the eyeglasses support 13 in position. The eyeglasses support 13 extends forward to a point under the lenses 14 of the eyeglasses 10. The eyeglasses support 13 terminates in a small rest 15 which bears upward on the lenses 14. The small rest 15 may be flat or it may be contoured to fit around the bottom edge of the lenses 14. This will provide additional support for the eyeglasses 10 and prevent them from slipping down the nose 16.

Figure 3:
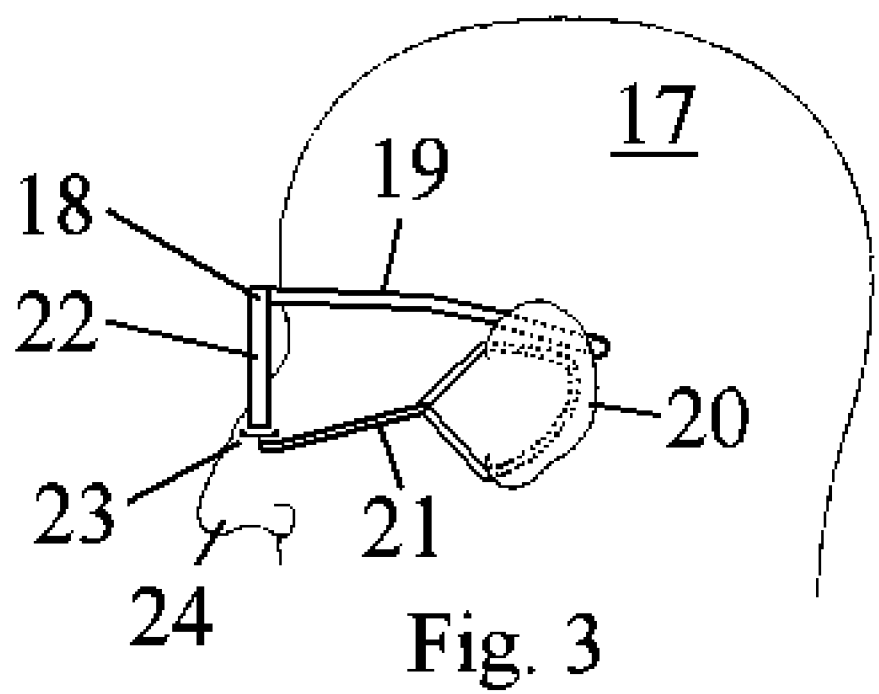
FIG. 3 is a side view of the eyeglasses support showing a third embodiment.

In a third embodiment, FIG. 3 shows a person 17 wearing a pair of eyeglasses 18. The earpieces 19 of the eyeglasses 18 fit behind the ear 20 of the person 17. The eyeglasses support 21 fits tightly around the ear 20, passing either over or under the bottom of the ear 20, wrapping behind the ear 20, around the bottom or top of the ear 20, and connecting to itself by wrapping the end of the eyeglasses support 21 around a middle part of the eyeglasses support 21, to firmly hold the eyeglasses support 21 in position. The eyeglasses support 21 extends forward to a point under the lenses 22 of the eyeglasses 18. The eyeglasses support 21 terminates in a small rest 23 which bears upward on the lenses 22. The small rest 23 may be flat or it may be contoured to fit around the bottom edge of the lenses 22. This will provide additional support for the eyeglasses 18 and prevent them from slipping down the nose 24.

Figure 4:
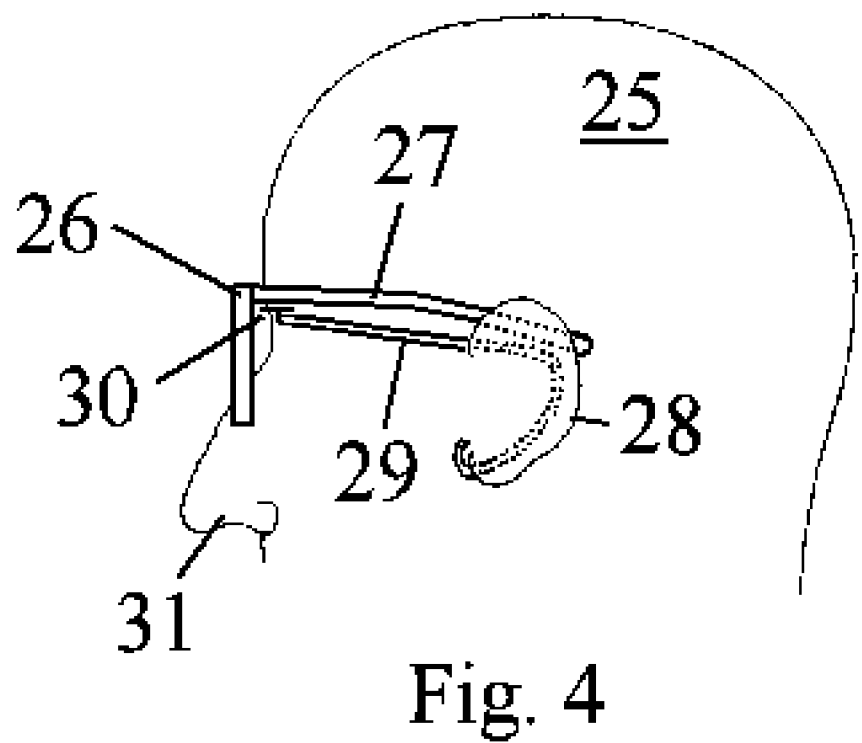
FIG. 4 is a side view of the eyeglasses support showing a fourth embodiment.
Figure 5:
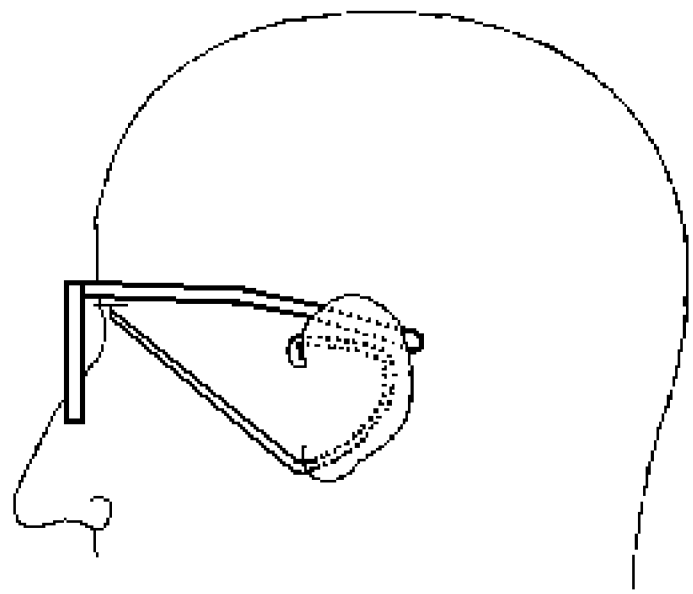
FIG. 5 is a side view of a first alternate mounting of the fourth embodiment.
Figure 6:
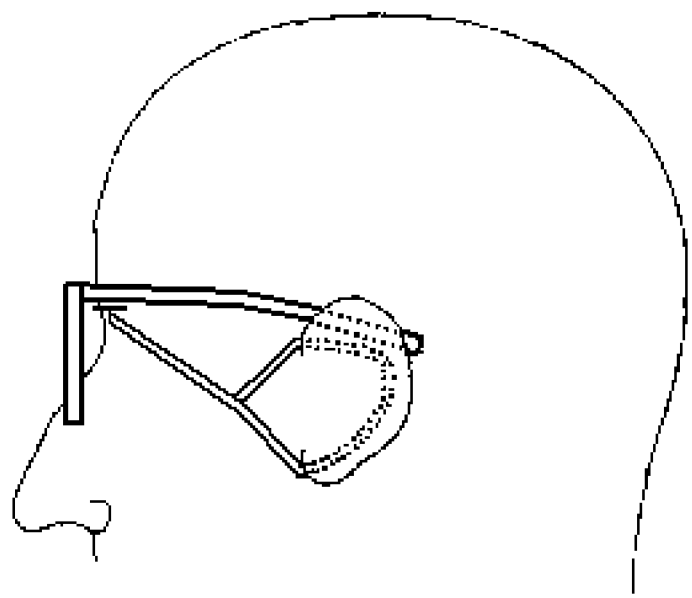
FIG. 6 is a side view of a second alternate mounting of the fourth embodiment

In a fourth embodiment, FIG. 4 shows a person 25 wearing a pair of eyeglasses 26. The earpieces 27 of the eyeglasses 26 fit behind the ear 28 of the person 25. The eyeglasses support 29 fits tightly around the ear 28 and extend forward to a point under forward end of the earpieces 27 of the eyeglasses 26. Although FIG. 4. shows the eyeglasses support 29 fitting around the ear 28 in the same manner as shown in FIG. 1, the embodiments shown in FIGS. 2 and 3 may also be used with this embodiment, as seen in FIGS. 5 and 6. The eyeglasses support 29 terminates in a small rest 30 which bears upward on the forward end of the earpieces 27. The small rest 30 may be flat or it may be contoured to fit around the bottom edge of the earpieces 27. This will provide additional support for the eyeglasses 26 and prevent them from slipping down the nose 29.

Referring now to a fifth embodiment in FIG. 7, if additional stability for a pair of eyeglasses (not shown) is desired, a pair of the eyeglasses supports 32 may be used on each side of the head 33 to support the eyeglasses. An optional brace 34 may be used to connect the eyeglasses supports 32 together around the back of the head 33. The brace 34 may made of a material similar to that used by the eyeglasses supports 32.

In a sixth embodiment, FIG. 8 shows a person 35 wearing a pair of eyeglasses 36. The earpieces 37 of the eyeglasses 36 fit behind the ear 38 of the person 35. The eyeglasses support 39 connects to an ear mounted appliance 40, such as a bluetooth earphone. The connection may be made in any known manner. The eyeglasses support 39 extends forward to a point under the lenses 41 of the eyeglasses 36. The eyeglasses support 39 terminates in a small rest 42 which bears upward on the lenses 41. The small rest 42 may be flat or it may be contoured to fit around the bottom edge of the lenses 41. This will provide additional support for the eyeglasses 36 and prevent them from slipping down the nose 43.

Although the Auxiliary Eyeglasses Support and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A auxiliary support for stabilizing a pair of eyeglasses comprising:
    an elongated earpiece,
    one end of said earpiece having a curved portion configured to fit tightly around a person's ear,
    the opposite end of said earpiece having a rest upon which a forward part of the eyeglasses may rest.

2. A auxiliary support for stabilizing a pair of eyeglasses as claimed in claim 1 further comprising: said rest is positioned to support the lower edge of the lenses of said eyeglasses.

3. A auxiliary support for stabilizing a pair of eyeglasses as claimed in claim 2 further comprising: said rest is contoured to fit around said lower edge of said lenses of said eyeglasses.

4. A auxiliary support for stabilizing a pair of eyeglasses as claimed in claim 1 further comprising: said rest is positioned to support the lower edge of the forward part of the earpieces of said eyeglasses.

5. A auxiliary support for stabilizing a pair of eyeglasses as claimed in claim 4 further comprising: said rest is contoured to fit around said lower edge of said lower edge of said forward part of said earpieces of said eyeglasses.

6. A auxiliary support for stabilizing a pair of eyeglasses as claimed in claim 1 further comprising:
    said earpiece is pliable,
    said curved portion is adjustable in length by adjusting the position of said curved potion along the length of said earpiece by bending said earpiece around said ear.

7. A auxiliary support for stabilizing a pair of eyeglasses as claimed in claim 6 further comprising: said curved portion passes over the top of said ear, around the back of said ear, and under the bottom of said ear.

8. A auxiliary support for stabilizing a pair of eyeglasses as claimed in claim 6 further comprising: said curved portion passes under the bottom said ear, around the back of said ear, and over the top of said ear.

9. A auxiliary support for stabilizing a pair of eyeglasses as claimed in claim 6 further comprising: said curved portion passes around said ear, and the end of said curved portion connects to a middle part of said earpiece.

10. A auxiliary support for stabilizing a pair of eyeglasses as claimed in claim 1 further comprising: a second auxiliary support for stabilizing a pair of eyeglasses used to support the opposite side of said eyeglasses.

11. A auxiliary support for stabilizing a pair of eyeglasses as claimed in claim 10 further comprising: a connecting piece which connects said curved portions together around the back of a person's head.

12. A auxiliary support for stabilizing a pair of eyeglasses comprising:
    an elongated earpiece,
    one end of said earpiece having a connection for attachment to an ear mounted appliance,
    the opposite end of said earpiece having a rest upon which a forward part of the eyeglasses may rest.

* * * * *